(12) United States Patent
Bird et al.

(10) Patent No.: US 7,432,445 B2
(45) Date of Patent: Oct. 7, 2008

(54) WIRE INLINE T TAP/SPLICE

(75) Inventors: Rodger Bird, Canton, MI (US); Robert Vitali, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/612,056

(22) Filed: Dec. 18, 2006

(65) Prior Publication Data

US 2008/0142243 A1    Jun. 19, 2008

(51) Int. Cl.
    *H02G 3/06*    (2006.01)
(52) U.S. Cl. ........................................................ 174/92
(58) Field of Classification Search .................... 174/92, 174/138 F
    See application file for complete search history.

(56) References Cited

U.S. PATENT DOCUMENTS

| | | | |
|---|---|---|---|
| 3,875,325 A | 4/1975 | Anderson et al. | |
| 4,610,738 A | 9/1986 | Jervis | |
| 4,685,756 A | 8/1987 | Gamarra | |
| 4,849,580 A | 7/1989 | Reuter | |
| 4,900,264 A | 2/1990 | Bennett et al. | |
| 4,963,700 A | 10/1990 | Olsen et al. | |
| 5,214,248 A | 5/1993 | Jamison | |
| 5,347,084 A | 9/1994 | Roney et al. | |
| 5,382,756 A | 1/1995 | Dagan | |
| 5,525,073 A | 6/1996 | Sampson | |
| 5,561,269 A * | 10/1996 | Robertson et al. | 174/92 |
| 5,656,797 A | 8/1997 | Lin | |
| 5,684,274 A | 11/1997 | McLeod | |
| 5,696,351 A | 12/1997 | Benn et al. | |
| 5,763,835 A | 6/1998 | Huynh-Ba et al. | |
| 5,834,694 A * | 11/1998 | Bakker et al. | 174/652 |
| D432,092 S | 10/2000 | Stebleton et al. | |
| 6,177,634 B1 | 1/2001 | Smith | |
| 6,280,235 B1 | 8/2001 | Radliff | |
| 6,359,228 B1 | 3/2002 | Strause et al. | |

(Continued)

FOREIGN PATENT DOCUMENTS

FR    2672444    8/1992

(Continued)

OTHER PUBLICATIONS

Search Report, dated Mar. 18, 2008, 1 page.

*Primary Examiner*—Chau N Nguyen
(74) *Attorney, Agent, or Firm*—Frank A. MacKenzie; Brooks Kushman P.C.

(57) ABSTRACT

A splice enclosure is provided for enclosing a splice of a plurality of wires. The splice enclosure comprises first and second shells, a first conductor arrangement and a second conductor arrangement. The first and second shells are adapted to mate with each other and each include an interior channel that extends between ends of the first and second shells. The interior channels are capable of allowing the plurality of wires to pass through the splice enclosure. The first conductor arrangement is disposed in the interior channel of the first shell and is capable of supporting the plurality of wires. The second conductor arrangement is disposed in the interior channel of the second shell and is capable of applying a force on the plurality of wires positioned within the first conductor arrangement of the first shell. The second conductor arrangement clamps the plurality of wires with the first conductor arrangement.

19 Claims, 3 Drawing Sheets

U.S. PATENT DOCUMENTS

| | | |
|---|---|---|
| 6,544,070 B1 | 4/2003 | Radliff |
| 6,903,276 B2 | 6/2005 | Eisele |
| 6,955,558 B1 | 10/2005 | Low et al. |
| 7,012,194 B1 * | 3/2006 | Wang .......................... 174/92 |
| 2004/0065467 A1 | 4/2004 | Radelet et al. |
| 2006/0011372 A1 * | 1/2006 | Rodrigues et al. ............. 174/92 |

FOREIGN PATENT DOCUMENTS

| | | |
|---|---|---|
| JP | 08185908 A | 7/1996 |
| JP | 10021972 | 1/1998 |
| JP | 2000048870 | 2/2000 |

* cited by examiner

WIRE INLINE T TAP/SPLICE

BACKGROUND

1. Field of the Invention

The invention relates to a splice enclosure and more specifically to a splice enclosure that splices wires together in response to first and second conducting arrangements being clamped together.

2. Background Art

Conventional methods of splicing wires involve the use of various forms of heat shrink tubes. In one example, the heat shrink tube may have a core-solder disposed at the center. The heat shrink tube may be made of PVC, Polyolefin, Kynar, Neoprene and Viton. A user generally applies the heat shrink tube over the wires to be spliced together. The user may apply heat via a heat gun or other known heating device to allow the solder from the core to disperse over the wires and the heat shrink wrap to be dispensed over the core and the wires.

Other conventional methods may include crimping wires together with a crimp joint. After the crimp joint has been crimped over the wires, solder is melted over the crimp joint. A piece of heat shrink may be positioned over the crimp joint and melted to form a protective layer over the splice. While such techniques may be commonly used and accepted, the use of heat shrink when applied over a wire splice is generally time consuming and requires a heating device in order to perform the operation. Also, the user may not know if enough solder has been distributed throughout the wires to allow for sufficient conduction in the splice. In addition, the use of a standalone crimp joint is often hard to install over a plurality of wires and difficult to crimp if the wiring is already positioned in a vehicle. Finally, heat shrink devices which include a core-solder may be expensive.

Accordingly, it would be desirable to provide a splice enclosure that is inexpensive and easy to install over wires. It would also be desirable to provide a splice enclosure which prevents oxidation of the wires after the wires have been spliced together and eliminates the use of heat and adhesives commonly associated with heat shrink based devices.

SUMMARY

In one non-limiting embodiment, a splice enclosure is provided for enclosing a splice of a plurality of wires. The splice enclosure comprises first and second shells, a first conductor arrangement and a second conductor arrangement. The first and second shells are adapted to mate with each other and each include an interior channel that extends between ends of the first and second shells. The interior channels are capable of allowing the plurality of wires to pass through the splice enclosure. The first conductor arrangement is disposed in the interior channel of the first shell and is capable of supporting the plurality of wires. The second conductor arrangement is disposed in the interior channel of the second shell and is capable of applying a force on the plurality of wires positioned within the first conductor arrangement of the first shell. The second conductor arrangement clamps the plurality of wires with the first conductor arrangement and allows conduction between the plurality of wires when the first and second shells are mated together.

DETAILED DESCRIPTION OF THE PREFERRED EMBODIMENT(S)

Figure 1:
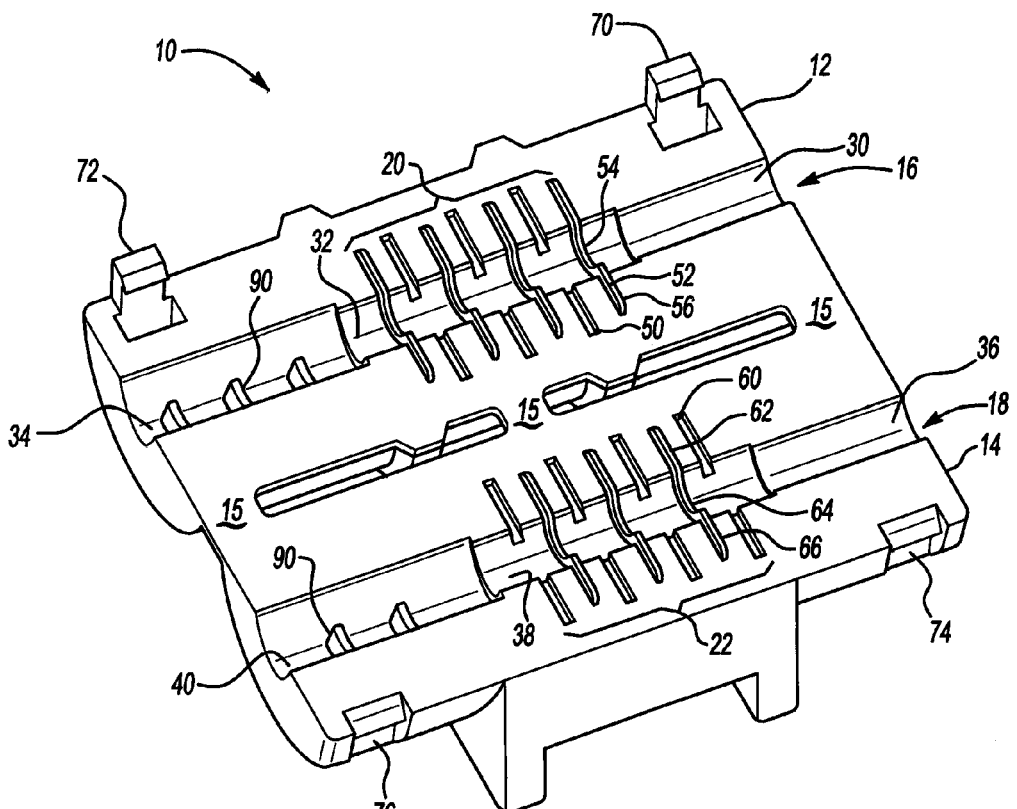
FIG. 1 illustrates an exemplary splice enclosure in accordance with an embodiment of the present invention.

Referring to FIG. 1, a splice enclosure 10 is shown in accordance with one embodiment of the present invention. The splice enclosure 10 comprises a first shell 12 and a second shell 14. The first and second shells 12 and 14 are generally shaped in the form of half cylinders. It is recognized however that alternative embodiments may have other forms without departing from the scope of the present invention. The first and second shells 12 and 14 are generally made of nylon. The first and second shells 12 and 14 may also be made of poly propylene, nylon zytel 70G33L, or BASF Ultramid B3S. A plurality of hinges 15 couples the first and second shell together. The first shell 12 includes an interior channel 16 which extends between ends of the first shell 12. The interior channel 16 may be shaped in the form of a U-shape. The second shell 14 includes an interior channel 18 which extends between ends of the second shell 14. The interior channel 18 of the second shell 14 may be shaped in the form of a U-shape. The interior channels 16 and 18 are configured to support a plurality of wires in splice enclosure 10.

The first shell 12 includes a first conductor arrangement 20 generally disposed at a center of the interior channel 16. The first conductor arrangement 20 comprises a plurality of grooves 50 and a plurality of conducting elements 52. The plurality of grooves 50 extend in a transverse direction in relation to the interior channel 16. Each conducting element 52 includes a U-shaped section 54 and ends 56. Each conducting element 52 is positioned in alternating grooves 50. In addition, each conducting element 52, when positioned in the grooves 50 are axially spaced and substantially parallel with each other. The conducting elements 52 are generally made of copper.

The interior channel 16 may be divided into separate channels based on different widths needed to support the desired gauge size of the wires. A support channel 30 may be defined as a portion of the interior channel 16 having a first width. A conductive channel 32 may be defined as a portion of the interior channel 16 having a second width. A retaining channel 34 may be defined as a portion of the interior channel having a third width. The widths of the support channel 30, the conductive channel 32 and the retaining channel 34 may be similar or different from one another. The particular width of the support channel 30, the conductive channel 32 and the retaining channel 34 may be varied to meet the design criteria of a particular implementation.

The depth of the retaining channel 34 may be deeper than the depth of the conductive channel 32 and the support channel 30. Such an increased depth in the returning channel 34 may be desirable to support one or more wires positioned in the splice enclosure 10. The depth of the support channel 30, the conductive channel 32, and the retaining channel 34 may be varied to meet the design criteria of a particular implementation.

The retaining channel 34 is configured to support two or more coated wires having exposed sections of wire positioned at the center of the coated wires. The support channel 30 may be configured to support the coated portions of one or more wires. The conductive channel 32 may be configured to support all of the exposed portions (uncoated portions) of the wires positioned in the splice enclosure 10. The first width of the retaining channel 32 is larger than the width of the other channels. Such an increase in width is necessary to support the coated sections of the two or more wires. The second width of the conductor channel 32 may be greater than the third width of the support channel 30 to ensure that the conductor channel 32 properly supports all of the exposed sections of wires that are needed to be spliced together. The third width of the support channel 30 may be smaller than the widths of the other channels.

The conductor channel 32 is configured to receive and support the U-shaped sections 54 of the conducting elements 52. The U-shaped sections 54 of the conducting elements 52 protrude from a base of the conductor channel 32 to allow the exposed regions of the wires to sufficiently make contact with the U-shaped sections 54. The grooves 50 are configured to receive and support the ends 56 of the conducting elements 52. The ends 56 are configured to protrude from the grooves 50.

The second shell 14 includes a second conductor arrangement 22 generally disposed at a center of the interior channel 18. The second conductor arrangement 22 comprises a plurality of grooves 60 and a plurality of conducting elements 62. The plurality of grooves 60 extend in a transverse direction in relation to the interior channel 18. Each conducting element 62 includes a U-shaped section 64 and ends 66. Each conducting element 62 is positioned in alternating grooves 60. In addition, each conducting element 62, when positioned in the grooves 60 are axially spaced and substantially parallel with each other. The conducting elements 62 are generally made of copper.

The interior channel 18 may be divided into separate channels based on different widths. A support channel 36 may be defined as a portion of the interior channel 18 having a first width. A conductive channel 38 may be defined as a portion of the interior channel 18 having a second width. A retaining channel 40 may be defined as a portion of the interior channel 18 having a third width. The widths of the support channel 36, the conductive channel 38 and the retaining channel 40 may be similar or different from one another. The particular width of the support channel 36, the conductive channel 38, and the retaining channel 40 may be varied to meet the design criteria of a particular implementation.

The depth of the retaining channel 40 may be deeper than the depth of the conductive channel 38 and the support channel 36. Such an increased depth in the retaining channel 40 may be desirable to support one or more wires positioned in the spline enclosure 10. The depth of the support channel 36, the conductive channel 38, and the retaining channel 40 may be varied to meet the design criteria of a particular implementation.

The retaining channel 40 may be configured to support the coated portions of two or more wires. The support channel 36 may be configured to support the coated portion of one or more wires. The conductive channel 38 may be configured to support all of the exposed portions of the wires.

The first width of the retaining channel 34 is larger than the width of the other channels. Such an increase in width may be desirable to support the coated sections of the two or more wires. The second width of the conductor channel 38 may be greater than the third width of the support channel 36 to ensure that the conductor channel 38 supports all of the exposed sections of wires that need to be spliced together.

The conductor channel 38 is configured to receive and support the U-shaped sections 64 of the conducting elements 62. The U-shaped sections 64 of the conducting elements 62 protrude from the base of the conductor channel 38 to allow the exposed regions of the wires to sufficiently make contact with the U-shaped sections 64. The grooves 60 are configured to receive and support the ends 66 of the conducting elements 62. The ends 66 are configured to protrude from the grooves 60.

The first shell 12 includes a first locking tab 70 and a second locking tab 72. The first and second locking tabs 70 and 72 are disposed in the interior portion of the first shell. The first locking tab 70 is distally located from the second locking tab 72. The second shell 14 includes at first receiving tab 74 and a second receiving tab 76. The first receiving tab 74 is distally located from the second receiving tab 74. The first and second receiving tabs 74 and 76 are configured to slideably receive the first and second locking tabs 70 and 72. A secondary locking mechanism includes the first and second locking tabs 70 and 72 and the first and second receiving tabs 74 and 76. A tie strap (not shown) may be placed around the exterior of the first and second shells 12 and 14 for fully mating the first and second shells 12 and 14.

Figure 2:
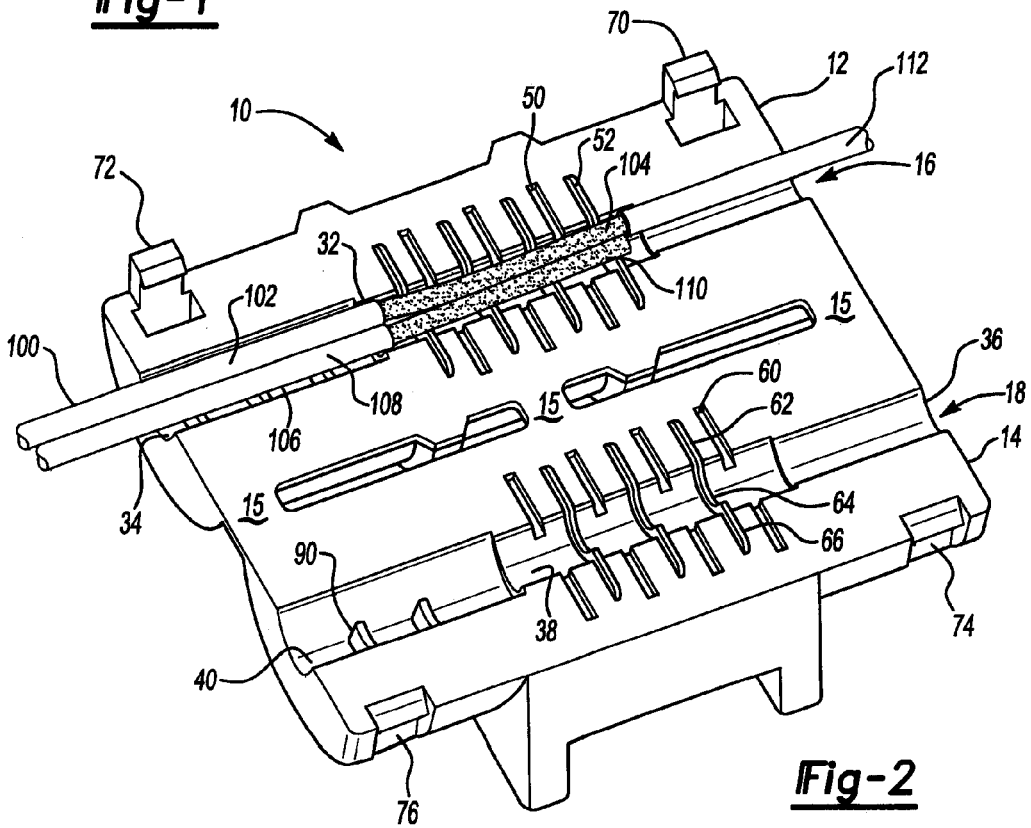
FIG. 2 illustrates the splice enclosure having a plurality of wires positioned in the interior cavities of the first and second shells.

Referring to FIG. 2, a splice enclosure 10 having a plurality of wires positioned therein is shown. A first wire 100 is shown having a coated portion 102 and an exposed portion 104. A second wire 106 is shown having a coated portion 108 and an exposed portion 110. In operation, a user may position the exposed portion 104 of the first wire 100 in the conducting channel 32 (FIG. 1) and the coated portion 102 in the retaining channel 34 (FIG. 1). Likewise, the user may position the exposed portion 110 of the second wire 106 in the conducting channel 32 and the coated portion 108 in the retaining channel 34. A coated portion 112 of the first wire 100 may be positioned in the support channel 30. The user may close the first and second shells 12 and 14 such that the locking tabs 70 and 72 are received by the receiving tabs 74 and 76. In such a state, the splice enclosure 10 is in a semi-closed state.

While in the semi-closed state, there is sufficient clamping force being applied between the first and second conducting arrangements 20 and 22 to clamp the wires together in the conducting channels 32 and 38. In the semi-closed state, the user may position the tie strap around the exterior of the splice enclosure 10 without the first and second shells 12 and 14 being separated from each other since the secondary locking mechanism holds the first and second shells 12 and 14 in place. The user may tighten the tie strap and place the first and second shells 12 and 14 into a fully closed state. In such a state, the clip applies the necessary force to mechanically splice the wires 100 and 106 together.

The conducting elements 52 of the first conducting arrangement 20 are offset from the conducting elements 62 of second conducting arrangement 22. Such a configuration allows the grooves 50 of the first conducting arrangement 20 to receive the conducting elements 62 of the second conducting arrangement 22 when the first and second shells 12 and 14 are closed. In addition, the grooves 60 of the second conducting arrangement 22 are configured to receive the conducting elements 52 of the first conducting arrangement 20 when the first and second shells 12 and 14 are closed. The alternating sequence of conducting elements 52 and 62 with respect to the grooves 50 and 60 allows increased force to be applied to the wires to ensure a strong low loss electrical connection.

At least one retaining rib 90 may be disposed in the retaining channel 34 to retain the wires 100 when the first and second shells 12 and 14 are fully closed. The retaining rib 90 ensures that the splice enclosure 10 is in compliance with pull-out forces as disclosed, for example, in the USCAR-21 connector specification (USCAR-21, Rev. 1, April 2004). In addition, at least one retaining rib may be disposed in the retaining channel 40 to retain the wires when the first and second shells 12 and 14 are fully closed. Alternate embodiments may include retaining ribs positioned in the support channels 30 and 36.

A plurality of gel strips (not shown) may be positioned in any of one of the grooves 50 and 60 which are not populated by a conductive element 52 and 62. The gel strips are configured to erupt and dispense an anti-oxidization gel throughout the conductive channels 32 and 38 in response to the first and second shells 12 and 14 being fully closed. Such a gel prevents oxidation on the exposed portions of the wires.

Figure 3:
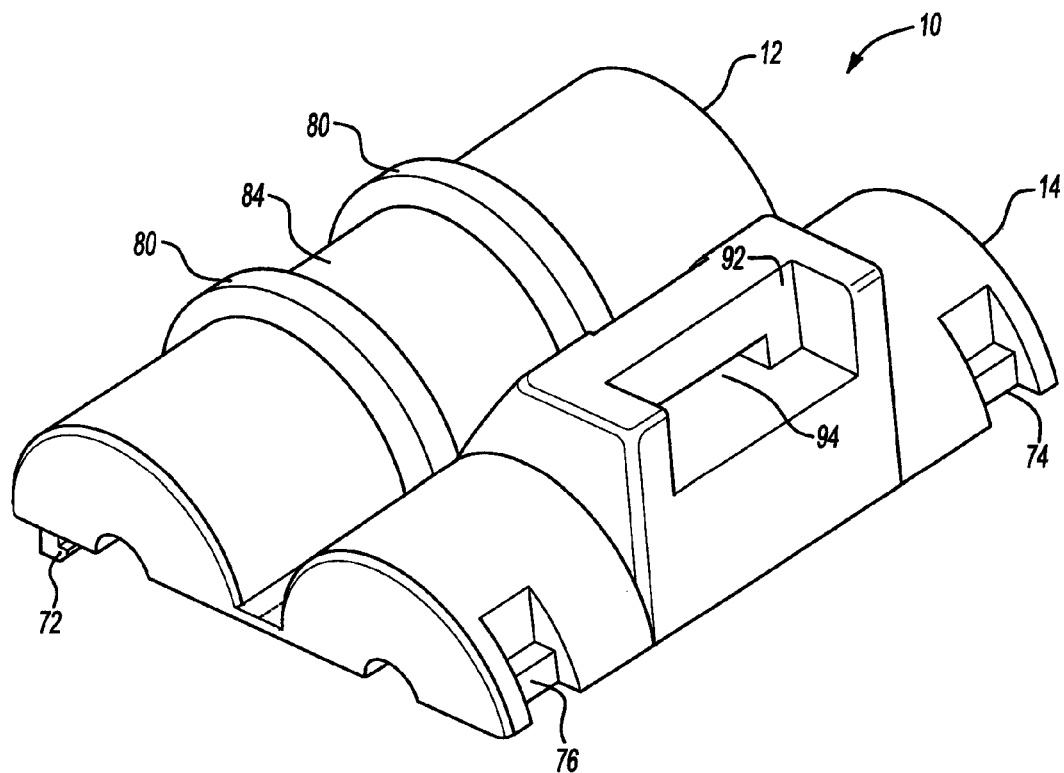
FIG. 3 illustrates an exterior of the splice enclosure.

Referring to FIG. 3, an exterior portion of the splice enclosure 10 is shown in accordance with one embodiment of the present invention. A pair of ribs 80 are disposed on an exterior of the first shell 12 for defining a cavity 84 therebetween. A cross member frame 92 is disposed on an exterior of the second shell 14. The cross member frame 92 defines a cross member channel 94. The tie strap may be placed through the cross member channel 94 and through the channel 84 to fully secure the first and second shells 12 and 14. A primary locking mechanism of the splice enclosure 10 includes the ribs 80, the cavity 84, the cross member frame 92, the cross member channel 94, and the tie strap.

Figure 4:
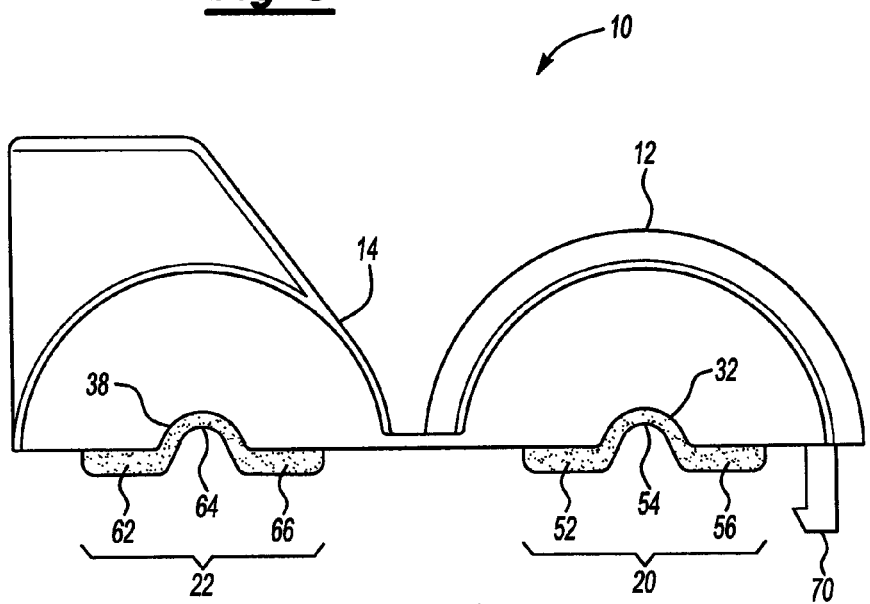
FIG. 4 illustrates a cross sectional view of the splice enclosure.

Referring to FIG. 4, a side view of the splice enclosure 10 is shown in accordance with one embodiment of the present invention. The conducting elements 52 are configured to protrude out of the conductive channel 32. Likewise, the conducting elements 62 are configured to protrude out of the conductive channel 38. Such a protrusion allows the conducting elements 52 and 62 to bite into the exposed portions of the wires to ensure sufficient contact. As noted in connection with FIG. 1, the conducting elements 52 and 62 are disposed in the first and second conducting arrangements such that the conducting elements 52 and 62 are offset from each other. Such an offset prevents the conducting elements 52 and 62 form making contact at the same point on the exposed portions of the wires thereby reducing the potential of breaking strands from the exposed sections of the wires.

Figure 5:
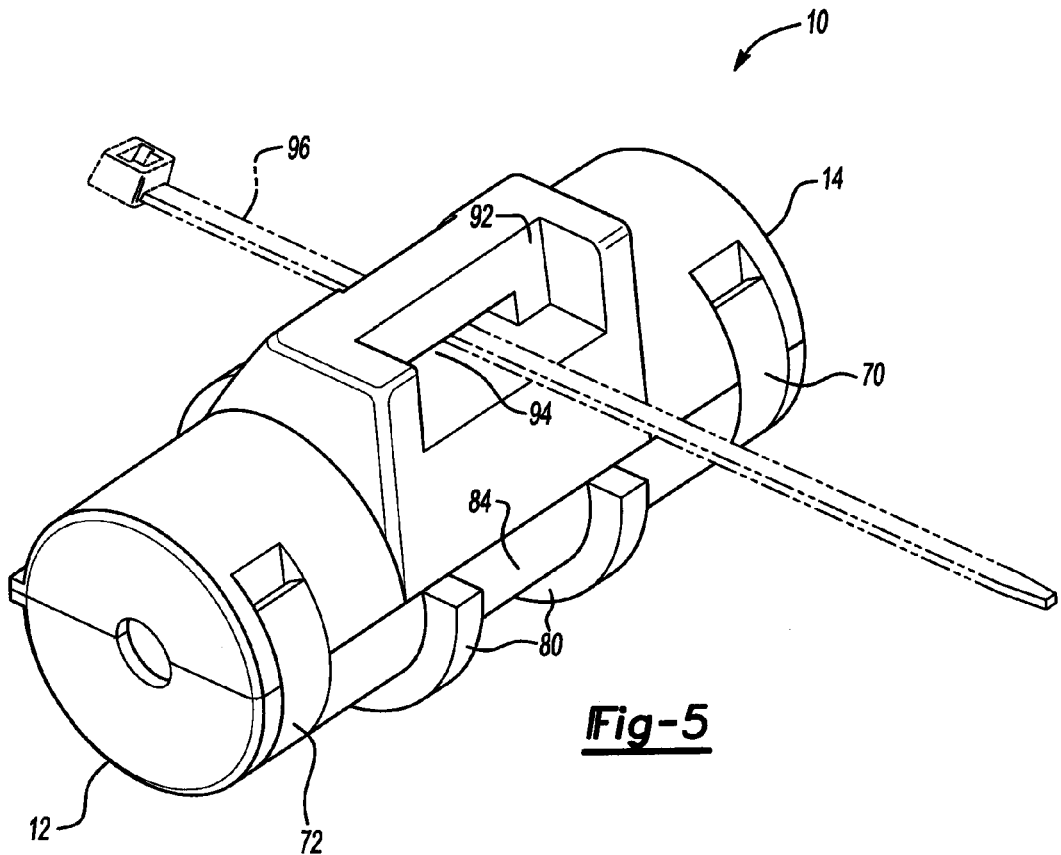
FIG. 5 illustrates the splice enclosure in a closed position.

Referring to FIG. 5, a diagram of the splice enclosure 10 is shown in the closed state. A tie strap 96 may be inserted into the cross member channel 94. The tie strap 96 generally includes a male end and a female end. The tie strap 96 may be wrapped around the channel 84 of the first shell 12 and looped back over the second shell 14. As the male end of the tie strap 96 travels through the female end, additional clamping force may be exerted on the wires positioned between the first and second shells 12 and 14. While FIG. 5 generally illustrates the use of a tie strap 96, the use of the tie strap 96 may not be needed if no additional clamping force is needed to keep the wires together in the conducting channels 32 and 38.

In one example, the splice enclosure 10 may implemented with an alternative locking mechanism as opposed to the use of the tie strap 96. Tabs (not shown) may be positioned and centered on the first and second shells 12 and 14. Each tab may include a hole centered on the tab. The holes may be adapted to threadedly receive a fastener in order to apply additional clamping force against the wires positioned between the first and second shells 12 and 14 if such an additional force is needed. With such a configuration, the splice enclosure 10 may be implemented without the pair of ribs 80 and the cross member frame 92.

Figure 6:
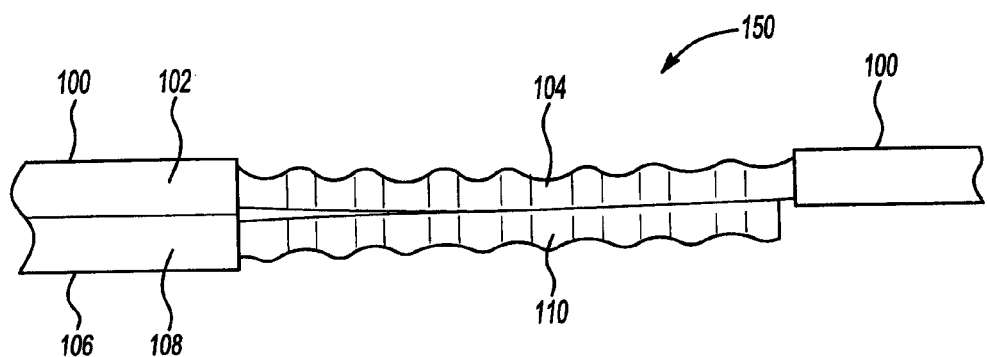
FIG. 6 illustrates the shape of the wires after being spliced in the splice enclosure.

FIG. 6 illustrates a non-limiting exemplary shape of the exposed portions of wires 104 and 110 after being mechanically spliced by the splice enclosure 10. The exposed portions of wires 104 and 110 may take the form of a wavy pattern. The wavy pattern exhibited by portions of the wires 104 and 110 are in such a state because of the force applied by conducting elements 52 and 62 when the first and second shells 12 and 14 are in a closed position.

The embodiments of the present invention provides a low cost device for effectively splicing wires without the need for heat shrink based devices. Such conventional heat shrink devices are expensive and require additional steps when used. The splice enclosure 10 may be easily installed in any aftermarket setting where it may be necessary to splice into wires already assembled into a vehicle. The splice enclosure 10 may be adapted to support any number of gauge sizes. The splice enclosure 10 may be fully compliant with the automotive connector specification USCAR-21. The splice enclosure 10 may be configured to withstand temperatures between +/−40 deg C. The splice enclosure 10 may comply with the resistance measurement delta of USCAR-21. The use of the splice enclosure 10 is not limited to automotive use and may be extended to apply to any application where it is necessary to form a splice and thereafter, keep the splice together.

While the best mode for carrying out the invention has been described in detail, those familiar with the art to which this invention relates will recognize various alternative designs and embodiments for practicing the invention as defined by the following claims.

What is claimed is:

1. A splice enclosure for enclosing a splice of a plurality of wires, the splice enclosure comprising:
   first and second shells adapted to mate with each other and each having an interior channel extending between ends of the first and second shells capable of allowing the plurality of wires to pass through the splice enclosure;
   a first conductor arrangement disposed in the interior channel of the first shell and capable of supporting the plurality of wires;
   a second conductor arrangement disposed in the interior channel of the second shell and capable of applying a force on the plurality of wires positioned within the first conductor arrangement of the first shell to clamp the plurality of wires against the first conductor arrangement and allow conduction between the plurality of wires when the first and second shells are mated together, wherein the first conductor arrangement comprises a plurality of conducting elements and a plurality of grooves centered in an interior of the first shell and extending in a transverse direction in relation to the interior channel and the second conductor arrangement comprises a plurality of conducting elements and a plurality of grooves centered in an interior of the second shell and extending in a transverse direction in relation to the interior channel; and
   at least one retaining rib disposed in the interior channel of each one of the first and second shells capable of retaining the plurality of wires in the splice enclosure when the first and second shells are mated together.

2. The splice enclosure of claim 1, further comprising a primary locking mechanism disposed about the first and second shells and capable of increasing the force between the first and second conductor arrangements when the primary locking mechanism is fully engaged.

3. The splice enclosure of claim 1, further comprising a secondary locking mechanism disposed about the first and second shells configured to hold the first and second shells in a partial mating state and to allow the second conductor arrangement to apply a portion of the force needed to clamp the wires together.

4. The splice enclosure of claim 1, wherein each conducting element in the first conductor arrangement includes a U-shaped section and ends extending in a transverse direction in relation to the interior channel of the first shell and each conducting element in the second conductor arrangement includes a U-shaped section and ends extending in a transverse direction in relation to the interior channel of the second shell.

5. The splice enclosure of claim 4, wherein the ends of each conducting element in the first conductor arrangement are disposed in the grooves of the first shell and the U-shaped section of each conducting element in the first conductor arrangement is disposed in the interior channel of the first shell and the ends of each conducting element in the second conductor arrangement are disposed in the grooves of the second shell and the U-shaped section of each conducting element in the second conductor arrangement is disposed in the interior channel of the second channel.

6. The splice enclosure of claim 5, wherein the ends of each conducting element in the first conductor arrangement protrude from the grooves of the first conductor arrangement and the U-shaped section of each conducting element in the first conductor arrangement protrude from the interior channel of the first shell and the ends of each conducting element in the second conductor arrangement protrude from the grooves of the second conductor arrangement and the U-shaped section of each conducting element in the second conductor arrangement protrude from the interior channel of the second shell.

7. The splice enclosure of claim 1, wherein each conducting element from the plurality of conducting elements in the first conductor arrangement is disposed into every other groove in the first conductor arrangement and each conducting element is axially spaced and substantially parallel to each other and each conducting element from the plurality of conducting elements in the second conductor arrangement is disposed into every other groove in the second conductor arrangement and each conducting element is axially spaced and substantially parallel to each other.

8. The splice enclosure of claim 1, wherein a conductive element from the first conductive arrangement directly faces an empty groove in the second conductive arrangement when the first and second shells are mated together and a conductive element from the second conductive arrangement directly faces an empty groove in the first conductive arrangement when the first and second shells are mated together.

9. The splice enclosure of claim 1, wherein the retaining rib extends outwardly from the interior channel and is capable of engaging any one or more of the plurality wires to prevent any one or more of the plurality of wires from being disengaged from the splice enclosure.

10. A splice enclosure for enclosing a splice of a plurality of wires, the splice enclosure comprising:
   first and second shells joined together along a hinge and each having an interior channel defined by varying widths and extending between ends of the first and second shells capable of allowing the plurality of wires to be supported by the splice enclosure;
   a first conductor arrangement disposed in the interior channel of the first shell and capable of supporting the plurality of wires; and
   a second conductor arrangement disposed in the interior channel of the second shell and capable of applying a force on the plurality of wires positioned within the first conductor arrangement of the first shell to clamp the plurality of wires against the first conductor arrangement and allow conduction between the plurality of wires.

11. The splice enclosure of claim 10, further comprising a primary locking mechanism disposed about the first and second shells and capable of increasing the force between the first and second conductor arrangements when the primary locking mechanism is fully engaged.

12. The splice enclosure of claim 10, further comprising a secondary locking mechanism disposed about the first and second shells configured to hold the first and second shells in a partial mating state and to allow the second conductor arrangement to apply a portion of the force needed to clamp the wires together.

13. The splice enclosure of claim 12, wherein the secondary locking mechanism comprises at least one locking tab and at least one receiving tab for slideably receiving the at least one locking tab.

14. The splice enclosure of claim 10, wherein the first conductor arrangement comprises a plurality of conducting elements and a plurality of grooves centered in an interior of the first shell and extending in a transverse direction in relation to the interior channel and the second conductor arrangement comprises a plurality of conducting elements and a plurality of grooves centered in an interior of the second shell and extending in a transverse direction in relation to the interior channel.

15. The splice enclosure of claim 14, wherein a conducting element from the first conductor arrangement directly faces an empty groove in the second conductor arrangement when the first and second shells are mated together and a conducting element from the second conducting arrangement directly faces an empty groove in the first conducting arrangement when the first and second shells are mated together.

16. The splice enclosure of claim 14, wherein each conducting element in the first conductor arrangement includes a U-shaped section and ends extending in a transverse direction in relation to the interior channel of the first shell and each conducting element in the second conductor arrangement includes a U-shaped section and ends extending in a transverse direction in relation to the interior channel of the second shell.

17. The splice enclosure of claim 16, wherein the ends of each conducting element in the first conductor arrangement are disposed in the grooves of the first shell and the U-shaped section of each conducting element in the first conductor arrangement is disposed in the interior channel of the first shell and the ends of each conducting element in the second conductor arrangement are disposed in the grooves of the second shell and the U-shaped section of each conducting element in the second conductor arrangement is disposed in the interior channel of the second channel.

18. The splice enclosure of claim 10, wherein the interior channel includes a conductive channel having a first width, a retaining channel having a second width, and a support channel having a third width in each of the first and second shells wherein the first width, the second with and the third width are different from each other.

19. A splice enclosure for enclosing a splice of a plurality of wires in an automotive vehicle, the splice enclosure comprising:
   first and second shells joined together along a hinge and each having an interior channel extending between ends of the first and second shells capable of allowing the plurality of wires to pass through the splice enclosure;
   a first conductor arrangement having a plurality of conducting elements and a plurality of grooves disposed in the interior channel of the first shell and capable of supporting the plurality of wires;
   a second conductor arrangement having a plurality of conducting elements and a plurality of grooves disposed in the interior channel of the second shell and the conducting elements of the second conductor arrangement is capable of applying a force on the plurality of wires positioned on the conducting elements of the first conductor arrangement to clamp the plurality of wires against the conducting elements of the first conductor arrangement and allow conduction between the plurality of wires when the first and second shells are mated together;
   at least one retaining rib disposed in the interior channel of each of the first and second shells capable of retaining the plurality of wires in the splice enclosure when the first and second shells are mated together; and
   at least one gel pack disposed in any one of the grooves of the first conductor arrangement and the grooves of the second conductor arrangement.

* * * * *